(12) United States Patent
Hurwitz (10) Patent No.: US 8,082,886 B2
(45) Date of Patent: Dec. 27, 2011

(54) DIRECT APPLICATION BRUSH WITH SPONGE

(75) Inventor: Marni Markell Hurwitz, Far Hills, NJ (US)

(73) Assignee: I Did It Inc., Far Hills, NJ (US)

( * ) Notice: Subject to any disclaimer, the term of this patent is extended or adjusted under 35 U.S.C. 154(b) by 817 days.

(21) Appl. No.: 12/079,454

(22) Filed: Mar. 27, 2008

(65) Prior Publication Data

US 2008/0178823 A1 Jul. 31, 2008

Related U.S. Application Data

(63) Continuation-in-part of application No. 11/788,666, filed on Apr. 20, 2007, now Pat. No. 7,814,917, which is a continuation-in-part of application No. 11/710,829, filed on Feb. 26, 2007, which is a continuation-in-part of application No. 11/710,848, filed on Feb. 26, 2007, now Pat. No. 7,694,687, which is a continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
*A01K 13/00* (2006.01)

(52) U.S. Cl. .......... 119/603; 132/112; 119/664; 119/651

(58) Field of Classification Search .......... 119/651–652, 119/664, 603, 604; 15/186–187, 194; 401/286–287; 132/112–116

See application file for complete search history.

(56) References Cited

U.S. PATENT DOCUMENTS

| | | | | |
|---|---|---|---|---|
| 1,607,674 A | * | 11/1926 | De Shazo Ives | 132/114 |
| 1,639,586 A | * | 8/1927 | Boucher | 401/28 |
| 2,325,758 A | * | 8/1943 | Ferguson | 401/28 |
| 2,663,890 A | * | 12/1953 | Sullins | 401/7 |
| 2,736,049 A | * | 2/1956 | Cohen | 401/42 |
| 3,453,059 A | * | 7/1969 | Noble | 401/289 |
| 3,574,885 A | * | 4/1971 | Jones | 15/393 |
| 3,589,819 A | * | 6/1971 | Bryant | 401/7 |
| 4,244,076 A | | 1/1981 | Meyer | 15/188 |
| 4,617,875 A | * | 10/1986 | Holland | 119/603 |
| 4,966,481 A | * | 10/1990 | Satten et al. | 401/205 |
| 5,150,491 A | | 9/1992 | Ikemoto | 15/1.52 |
| 5,261,426 A | | 11/1993 | Kellett et al. | 132/108 |
| 5,626,099 A | | 5/1997 | Staller et al. | 119/625 |
| 5,762,433 A | * | 6/1998 | Cary | 401/184 |

(Continued)

*Primary Examiner* — Rob Swiatek
*Assistant Examiner* — Ebony Evans
(74) *Attorney, Agent, or Firm* — Ernest D. Buff; Ernest D. Buff & Associates, LLC; Margaret A. LaCroix (57) ABSTRACT

A horse and/or livestock brush assembly with sponge element that releases a fluid and/or liquid solution directly onto a sponge element for foaming delivery onto the coat of an animal during sponging or washing. The brush assembly includes a brush base attached to a hose and flow regulator. The brush base comprises a flexible deformable membrane with a plurality of apertures that deliver fluid and/or liquid solution to a sponge element. The flexible deformable membrane and sponge element are fitted within a first opening of an internal cavity in a brush base. Delivery of the fluid or liquid solution is controlled by way of the flow regulator. An optional mixing chamber housing a water soluble compound containing active ingredients may be attached to the flow regulator to form a liquid solution. The liquid solution includes shampoos, conditioners, perfumes, fragrances and other active compositions including insect repellant, botanicals, dyes, moisturizers, or antibacterial compounds. The fluid and/liquid is delivered directly to the animal's fur or hair while sponging or washing the coat.

23 Claims, 7 Drawing Sheets

U.S. PATENT DOCUMENTS

| | | | |
|---|---|---|---|
| 6,116,798 A * | 9/2000 | Chen et al. ............... 401/42 |
| 6,439,241 B2 * | 8/2002 | Berke et al. ............... 132/200 |
| 6,450,127 B2 | 9/2002 | Willinger et al. ............... 119/663 |
| 6,543,388 B2 | 4/2003 | Willinger et al. ............... 119/663 |
| 6,575,174 B2 | 6/2003 | Lee ............... 132/160 |
| 6,948,451 B2 * | 9/2005 | Bond et al. ............... 119/665 |
| 7,926,492 B2 * | 4/2011 | Hurwitz ............... 132/112 |
| 2001/0055512 A1 * | 12/2001 | Waddell ............... 401/286 |

\* cited by examiner

DIRECT APPLICATION BRUSH WITH SPONGE

This is a Continuation-In-Part of application Ser. No. 11/788,666, filed Apr. 20, 2007, now U.S. Pat. No. 7,814,917 for "Add-on Hairbrush for Pets, People and Livestock That Releases Active Ingredients", which in turn is a Continuation-In-Part of application Ser. No. 11/710,829, filed Feb. 26, 2007, for "Pneumatic Hairbrush For Pet And People That Releases Active Ingredients In Powder Form", which in turn is a Continuation-In-Part of application Ser. No. 11/710,848, filed Feb. 26, 2007, now U.S. Pat. No. 7,694,687 for "Direct Application Brush For Horses And Livestock That Releases Active Ingredients", which in turn is a Continuation-In-Part of application Ser. No. 11/349,638, filed Feb. 8, 2006, now U.S. Pat. No. 7,322,364 for "Hairbrush for Pets and People that Releases Active Ingredients", which in turn is a Continuation-In-Part of application Ser. No. 11/186,583, filed Jul. 21, 2005, now U.S. Pat. No. 7,337,784 for "Hairbrush for Pets and People that Releases Active Ingredients", the disclosures of which are hereby incorporated in their entirety by reference thereto.

BACKGROUND OF THE INVENTION

1. Field of the Invention

The present invention relates to a direct application sponge-brush assembly for horses and livestock appointed with a flow regulator and lightweight hose for fluid delivery onto fur or hair; and more specifically to a brush assembly having a sponge which, during brushing, releases fluid fed through a hose associated with a flow regulator, wherein the flow regulator may optionally be attached to a mixing chamber containing a compound having active ingredients soluble in water to form a liquid solution appointed to be delivered through the hose into the brush and released into the sponge and delivered to the fur or hair. Active ingredients delivered through the liquid solution include therapeutic or moisturizing compounds, antibacterial compounds, insect repellant, flea and/or tic compounds, hair-conditioning and detangle products, sun protection lotions, mane and tail whiteners and stain removers, dye compositions, fragrances or other hair-related products.

2. Description of the Prior Art

Many patents address issues related to brush designs having a number of bristles adapted to provide desired brushing action. Brushes for pets, horses and livestock typically incorporate harsh bristles, while those for humans are typically provided with softer bristles. Several patents disclose coating bristles with desired compositions in order to deliver these compositions to the brushed hair. Various brush designs have been provided which replace bristles with other surfaces, such as sponges.

U.S. Pat. No. 4,244,076 to Meyer discloses a method and forming tool for the fabrication of a bristle support for a brush, especially a brush. The method involves attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear ends, together with the webs, are cast in the material of the bristle support, so that the bristle pin rows are embedded in the bristle support. In this method, the bristle pins are molded into a cast support that is rigid and solid and therefore is incapable of delivering perfume or other active compositions to the hair or fur being brushed. Moreover, the disclosed method does not provide a brush assembly with a sponge.

U.S. Pat. No. 5,150,491 to Ikemoto discloses a hairbrush adapted to prevent static charging of the bristles and hair. It has a multiplicity of small holes formed in a conductive brush base that carries a row of antistatic members. The antistatic members are relatively stiff. They are prevented from bending down, and render the brush easy to draw through hair, thereby facilitating smooth brushing. The conductive brush base is solid and the brush does not include a sponge for delivery of foaming liquid/liquid. It cannot deliver perfume or other active compositions to hair or fur, but merely eliminates the static present in the hair and bristles by conducting charges that are present.

U.S. Pat. No. 5,261,426 to Kellett, et al. discloses a hydrophilic foam pad for hair styling. The hair conditioning and styling pad has a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair or fur by way of a sponge.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips, each having magnetic properties, or a single magnetic sheet. Each strip has its magnetic poles aligned uniformly so that its longitudinal ends are polar opposites. The therapeutic groomer does not deliver perfume or active compositions to the hair or fur being groomed, nor does the groomer utilize a sponge instead of bristles.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a brush with a sponge that delivers perfumes or other active ingredients to brushed hair or fur by way of flow regulation of fluid fed into a cavity within the brush and delivered by way of a sponge.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries nail heads, which rests against and are glued to a thick rubber element using rubber cement or similar glue. The bristle pins in the rubber element form an air leak-tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied, thereby providing a springy feel, while the entrapped air is released through the single hole present in the elliptical rubber element. This brush has a single air outlet and discharges air entrapped in the elliptical cavity of the brush. It has no means available for delivering a perfume or other active ingredients to the brushed hair or fur, nor does it utilize a sponge instead of bristles.

U.S. Pat. No. 6,575,174 to Lee discloses a hair grooming brush having a plurality of rows of curved wavy bristles, rather than traditional straight bristles commonly found on brushes and combs. The curvature of the bristles produces springiness to the bristles when pressure is applied during the combing action. The springiness of the numerous rows of bristles translates into a massaging effect upon the hair and scalp. These springy bristles do not deliver perfumes or other active compositions to the hair or fur being brushed, nor does it utilize a sponge instead of bristles.

There remains a need in the art for an easy to use brush assembly for grooming horses and livestock that includes a sponge for delivery and continuously delivers fluid directly to the hair, mane, and fur. Specifically, there is a need in the art for a brush assembly providing a brush base with a sponge that is fitted with a flexible hose attached to a flow regulator for controlled fluid delivery. Also, there remains a need in the art for a brush assembly that can be connected to a mixing chamber to form a liquid solution containing active ingredients, including one or more active ingredients, such as perfume or other active compositions, appointed to be continuously delivered to the hair, mane, and fur of these animals by way of a sponge integrated within the brush base.

SUMMARY OF THE INVENTION

The present invention discloses a lightweight brush assembly having a brush base appointed with a hose and a flow regulator for controlled delivery of a fluid or liquid solution directly to an animal's fur through a porous sponge element. The brush base includes an internal cavity with a bottom surface having a first opening, a top surface having a second opening, and an orifice for delivery of the fluid into the internal cavity from the hose. The first cavity opening is located on the bottom surface of the brush base, holding a flexible deformable membrane and the sponge element of the brush. The second cavity opening is located on the top surface of the brush base, opposed to the sponge element. The flexible, deformable membrane includes a plurality of apertures, preferably made from rubber, may be fixedly carried in the sponge element or the sponge element may be separate from the flexible deformable membrane. The sponge element is porous and acts to deliver foamed liquid to the fur or hair of the animal. The sponge element is aligned with the apertures in the flexible deformable membrane so that a continuous liquid gel delivery is provided. The edges of the flexible deformable membrane are tightly fitted to or permanently bonded to the walls of the first opening of the internal cavity, thereby forming a substantially leak tight seal. The second cavity opening is fitted with a back cover.

The flow regulator is attached to a first end of a hose, while a second end of the hose is attached to the orifice of the brush base so that the hose delivers a fluid from the flow regulator into the internal cavity of the brush base. The flow regulator controls delivery of the fluid into the hose and visa vie the internal cavity of the brush base when sponging or washing the fur or hair, releasing the fluid through the apertures in the flexible deformable membrane into the sponge element and onto the fur or hair. Optionally, a mixing chamber may be attached to the flow regulator, wherein the mixing chamber houses a soluble compound with an active composition which dissolves in water delivered from the flow regulator to form a liquid solution that is fed into the brush base. The liquid solution contains a desired liquid gel of perfume or fragrance or other active compositions such as shampoos, conditioners, botanicals, insect repellants, hair-conditioning products, dye compositions, moisturizing ingredients, antibacterial compounds, and the like. When hair or fur is sponged or washed with the brush of the subject invention, the flow regulator is turned on and adjusted according to the desired flow rate and the fluid and/or liquid solution containing fragrance or perfume or other active composition is foamingly delivered to the hairs or fur of the coat being sponged through the sponge element, transferring the liquid gel perfume, fragrance or active ingredient to hairs or fur of the coat during sponging/treatment.

The sponge element may be fixedly attached to the flexible deformable membrane with apertures, and this may be achieved in numerous ways. The sponge element may be molded by bonded with the deformable membrane, as a unitary body with the apertures in the flexible deformable membrane intimate with the sponge element. In another embodiment, the sponge element is not attached to the flexible deformable membrane and instead is inserted and held within the first opening until it must be replaced. At which time the used sponge element is removed from the first opening and discarded and a replacement sponge element is inserted within the first opening in association with the deformable membrane. The sponge element delivers the foamed fluid and/or liquid solution containing perfume, fragrance or active ingredient along substantially its entire surface area and any hairs or fur of the coat contacting the sponge element or foam delivered therefrom is coated with the liquid gel of fragrance, perfume or active ingredient.

The brush is assembled first by inserting the flexible, deformable membrane and sponge element into the first opening of the internal cavity of the brush base. The deformable membrane is entirely contained within the first opening, wherein the perimeter of the membrane rests against the inner wall which is defined by the internal cavity. Next, the hose and flow regulator are connected to the orifice of the brush base for delivery of the fluid into the internal cavity of the brush base. During application, the fluid is delivered to the brush base and through the apertures within the flexible deformable membrane and into the sponge element for foam delivery into the hair or fur.

In another embodiment, the direct application brush assembly for horses and livestock comprises a molded brush base with a handle and an internal cavity with a bottom surface having a first opening, a top surface having a second opening and an orifice. The first opening is adapted to receive a sponge element having a flexible deformable rim. The sponge element is appointed for sponging or washing hair or fur of an animal. The second opening of the brush base is adapted to receive a cover that fits onto the second opening. A flow regulator is provided along with a hose having a first end fitted with the flow regulator and a second end fitted to the orifice of the brush base so that the hose delivers a fluid from the flow regulator into the internal cavity of the brush base. The flow regulator controls delivery of the fluid into the hose and visa vie the internal cavity of the brush base when sponging or washing the fur or hair, releasing the fluid through the sponge element onto the fur or hair.

Significant advantages are realized by practice of the present invention. The key features of the direct application horse brush assembly, include, in combination, the features set forth below:

1) a brush base has an internal cavity with a bottom surface having a first opening and top surface having a second opening, respectively;

2) the first opening is appointed to receive a flexible deformable membrane and a sponge element;

3) the second opening is appointed to receive a back cover;

3) the flexible deformable membrane has several rows of apertures provided therewithin which, in a preferred embodiment, enable transporting liquid to substantially the entire surface of the sponge element, facilitating uniform distribution of liquid thereover, for delivery onto the fur or hair;

4) optionally, an internal porous sponge or soluble disk saturated with a water soluble formulation of fragrance, perfume and/or other active composition may be inserted from the second opening in the internal cavity of the brush base. The optional porous sponge is arranged so that it rests on the flexible deformable membrane, feeding a sponge liquid solution to the apertures in the flexible deformable membrane and sponge element as water or fluid from the hose and visa vie flow regulator are delivered into the internal cavity of the brush base to dissolve and mix with the water soluble formulation saturated within the internal porous sponge;

5) a second end of a hose is connected to the orifice of the brush base, and a first end of the hose is connected to a flow regulator for controlled delivery of a fluid into the internal cavity of the brush base;

6) optionally, a mixing chamber containing a substantially water soluble compound having an active ingredient may be attached to the flow regulator so that as water travels through the flow regulator into the mixing chamber the compound is dissolved to form a liquid solution;

7) the user may periodically replace the optional mixing chamber with a fresh mixing chamber when the perfume, fragrance and/or other active composition is exhausted;

8) the sponge element may be removable so that the user can replace used or soiled sponge elements with a replacement sponge element;

whereby the user of the brush of the subject invention is provided with the capability to saturate the hairs or fur of the coat being sponged or washed with water, a shampoo, perfume, fragrance and/or other active compositions including insect repellant, hair conditioning products, dye compositions, moisturizing ingredients, antibacterial compounds, and the like.

BRIEF DESCRIPTION OF THE DRAWING

The invention will be more fully understood and further advantages will become apparent when reference is had to the following detailed description of the preferred embodiments of the invention and the accompanying drawings, in which:

FIG. 2b is a top plane view of the brush base of this invention depicted in FIG. 2a;

FIG. 2c is a bottom plane view of the brush base of this invention showing the flexible deformable membrane with apertures aligned with the sponge element depicted in FIG. 2a;

DETAILED DESCRIPTION OF THE INVENTION

This invention relates to a brush including a sponge element and flow regulator with hose assembly for use with horses and livestock. The brush assembly of the subject invention releases fluid through a sponge element, such as water, and/or a solution containing active compounds in substantially liquid form onto the fur, hair, mane, and coat of the horse and livestock, penetrating follicle depths and engaging the full hair or fur shaft. Fluid flow is controlled by the flow regulator, which feeds fluid into a hose that delivers the liquid into an internal cavity of a brush base for release through apertures in a flexible deformable membrane into an aligned sponge element and onto the fur or hair. A mixing chamber housing an active substantially water soluble compound may be attached to the flow regulator to mix with water to form a liquid solution that is delivered into the brush base and foam delivered from the sponge element. Active ingredients delivered in the liquid solution include shampoos, botanicals, fragrances, therapeutic or moisturizing compounds, hair-conditioning and detangle products, sun protection lotions, mane and tail whiteners and stain removers, dye compositions and other hair-related products, antibacterial compounds, flea and/or tic compounds, and insect repellant or the like. Direct delivery of the active compound onto the coat and mane of the animal provides optimal penetration and effectiveness of the product's treatment. Upon exhaustion of the liquid solution, water may continuously pass through the flow regulator into the hose to flush the assembly as well as rinse and finish cleaning the animal.

The present brush assembly's application is particularly directed to use with livestock and barn animals such as horses, ponies, llamas, cattle and the like, as well as family pets such as dogs and cats. These animals are oftentimes exposed to infection through parasites, such as ticks, and would benefit from a brush assembly that provided a direct delivery system utilizing a sponge element wherein medicament can be delivered quickly and efficiently to the animal's skin, without having to be rubbed in through the animal's coat. Direct delivery of the active ingredients of the product to the animal's skin and interstitials of the hair or fur of the coat through the sponge element provides optimal application without loss due to run-off from upper surface applications of the product. The sponge element further facilitates delivery by providing a porous, flexible format that saturates the full coat of the animal and provides foaming for deep and full penetration of the fur and hairs. As a result, exposure and contact of the active ingredients to the individual applying same is mitigated, while the delivery of the active ingredients is achieved in a highly efficient manner.

The brush assembly includes a brush base attached to a hose and flow regulator. The brush base is provided with a bottom surface having a first opening, a top surface having a second opening, and at least one side wall constructed to form an internal cavity. The brush base further includes an orifice for attachment to the hose and flow regulator. This orifice is preferably located on the side wall, extending externally from the side wall into the internal cavity. The first opening receives a flexible deformable membrane having a plurality of apertures to release fluid or/and a liquid solution containing shampoo, conditioner, botanical, perfume, fragrance, and/or active compositions to the sponge element during sponging or at the desire of the user at any time through controlled delivery by way of the flow regulator. The flexible deformable membrane has a plurality of apertures and is aligned with the sponge element, which may be fixedly attached to the flexible deformable membrane or detached therefrom so that the sponge element may be removed and replaced periodically with a fresh, clean replacement sponge element. Porous nature of the sponge element provides a continuous fluid/liquid gel/solution flow path and the compressible nature of the sponge provide the ability to foam the solution for foam delivery to the animal.

Figure 7A:
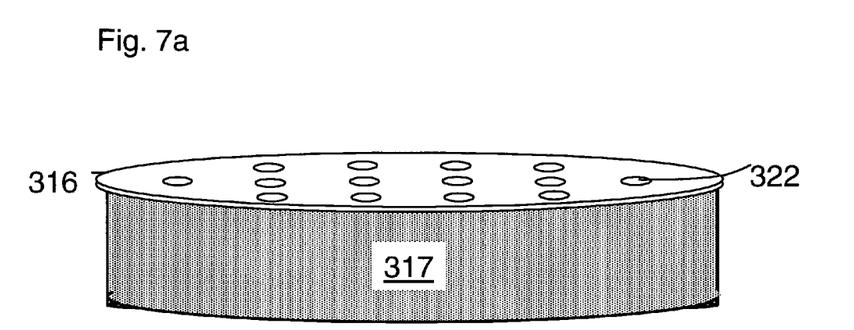
FIG. 7a is a top view of an embodiment of the sponge element and flexible deformable membrane.
Figure 7B:
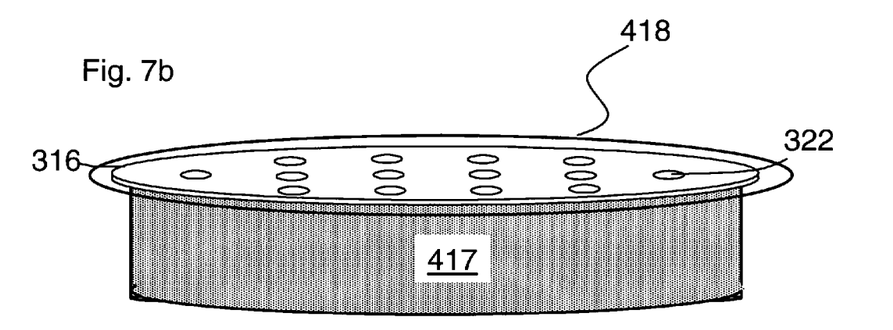
FIG. 7b is a top view of another embodiment of the sponge element wherein the sponge element includes an insertion rim to facilitate removal of the sponge element and insertion of a replacement sponge element.
Figure 7C:
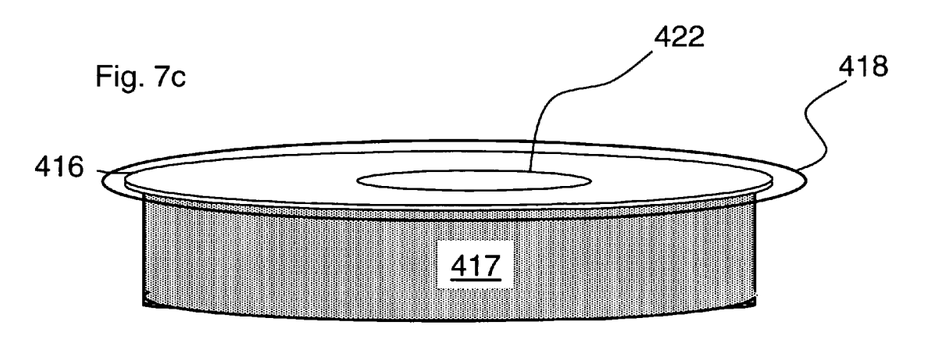
FIG. 7c is a top view of another embodiment of the sponge element wherein the sponge element includes an insertion rim to facilitate removal of the sponge element and insertion of a replacement sponge and the flexible deformable membrane has at least one aperture therein.

The first opening of the brush base receives the flexible deformable membrane having a plurality of apertures, or being porous in nature (alternatively, the flexible deformable membrane has at least one aperture, and in which case the aperture is larger in nature, see FIG. 7c herein). Further received is the sponge element, so that the sponge element extends from the brush base. The perimeter of the flexible deformable membrane and sponge element rests against the interior wall of the brush base defined by the internal cavity, thereby forming a substantially leak tight seal. Preferably, the flexible deformable membrane is permanently bonded to the walls of the first opening of the brush base. Preferably, the sponge element is removable from the brush base for replacement of the soiled or used sponge with a clean sponge element. A back cover is inserted through the second opening to form a substantially leak tight seal for the internal cavity.

The flow regulator operates to flush fluid through the hose and into the brush base. Fluid preferably is water or an aqueous solution. A mixing chamber may be attached to the flow regulator. This mixing chamber preferably contains a water soluble compound comprised of active ingredients. Water from the flow regulator is mixed with the compound within the mixing chamber to form a liquid solution, which is then delivered through the hose into the internal cavity of the brush base through the apertures within the flexible deformable membrane into the sponge element, and onto the animal's coat. Upon exhaustion of the liquid solution the sponge-brush may be removed from the animal, or water may continue to flow through the hose to rinse the solution animal, such as if the liquid solution is a shampoo or soap solution. Generally stated, the invention consists of a brush base with a sponge element which releases fluid and/or liquid solution containing fragrance, perfume and/or other active compositions during sponging or washing via a flow regulator. During the sponging or washing action the flow regulator is activated and fluid flows through the hose into the orifice and into the internal cavity to be delivered through the apertures of the flexible deformable membrane into the sponge element.

The first opening may take any shape including elliptical, circular, rectangular, or square-shaped. The second opening may take any shape including elliptical, circular, rectangular, or square-shaped. The flexible, deformable membrane and/or sponge element may take any shape including elliptical, circular, rectangular, or square-shaped. The back cover may take any shape including elliptical, circular, rectangular, or square-shaped. Any other suitable geometric shapes are within the scope of the present invention. Preferably, each of the first opening, second opening, flexible membrane, sponge element and back cover has the same general shape, respectively. At a minimum, all that is required is that, whatever its shape, the flexible deformable membrane and the cover form a substantially air tight seal with the internal cavity so that the fluid and/or liquid solution with perfume, fragrance and/or other active composition is released reliably through the sponge element.

The flexible deformable membrane is preferably made from rubber, typically with a thickness of $\frac{1}{32}$ inch to $\frac{3}{32}$ inch. At least one aperture is provided therein. Alternatively, the flexible deformable membrane includes a plurality of apertures. The apertures provided delivery to the sponge element and are typically 0.010-0.60 inches. The sponge element is preferably a typical sponge composition, porous and flexible in nature for foam delivery onto the animal's coat. Different abrasive qualities of sponge elements may be offered, ranging from soft, porous sponges to more course luffa sponges. The sponge element preferably has a thickness ranging from 0.25 inch to 3 inch. The sponge element may be permanently bonded to the flexible deformable membrane using glue or other attachment means so that a continuous liquid gel flow path is provided. This united body, the deformable flexible membrane and sponge element may be removable from the first opening of the brush base for replacement. Preferably, the flexible deformable membrane and the sponge element are not attached and the flexible deformable membrane is fixed within the first opening of the brush base while the sponge element is removable for replacement with a replacement sponge element (see FIGS. 7b and 7c). Use of the sponge element provides a significantly uniform distribution of the fluid and/liquid solution into the animal's coat.

Assembly of the brush of this invention comprises the steps of:
 1. Arranging a flexible deformable membrane with at least one aperture, preferably a plurality of apertures, adapted to receive and be attached (fixedly or removably) to a sponge element. The flexible deformable membrane is inserted through the first opening in the internal cavity of the brush base. Since the flexible deformable membrane has a slightly larger dimension than the first opening in the brush base, it must be flexed to insert the flexible deformable membrane. The perimeter of the flexible deformable membrane rests against the interior walls defined by the internal cavity, thereby forming an airtight seal. Alternatively, the flexible deformable membrane with attached bristles having a central aperture may be permanently bonded to the brush base.

2. Inserting a sponge element under the flexible deformable membrane to yield a sponge surface for contacting the animal's fur or hair. The sponge element may be fixedly attached to the flexible deformable membrane; or preferably is not attached, but is removable therefrom. When the sponge element is not attached to the flexible deformable membrane, it is inserted through the first opening in the internal cavity of the brush base under the flexible deformable membrane. In this embodiment, the sponge element has a flexible border being of a slightly larger dimension than the first opening in the brush base/received on a shelf in the first opening, so that the sponge element and flexible border must be flexed for insertion. The perimeter of the flexible border of the sponge element rests against the interior walls defined by the internal cavity, thereby forming an airtight seal, while the sponge portion of the sponge element is exposed for contact of the animal's coat. Alternatively, but not preferably, the sponge element may be permanently bonded to the brush base.

3. Optionally, a porous internal sponge or soluble disk saturated with a water soluble formulation of fragrance, perfume and/or other active composition may be inserted from the second opening into the internal cavity of the brush base. The optional internal porous sponge is arranged so that it rests on top of the flexible deformable membrane, feeding a sponge/disk liquid solution to the apertures in the flexible deformable membrane and central apertures in the bristles as water or fluid from the hose and visa vie flow regulator are delivered into the internal cavity of the brush base to dissolve and mix with the water soluble formulation saturated within the internal porous sponge for foaming traversing into the apertures of the flexible deformable membrane and into the interstices of the sponge element for delivery onto the animal's fur or hair and deep penetration into the coat.

4. The back cover is inserted over the second opening. This is a sliding fit providing a leak tight seal.

5. A second end of a hose is connected to the orifice of the brush base, and a first end of the hose is connected to a flow regulator for delivery of a fluid into the internal cavity of the brush base.

6. Optionally, a mixing chamber containing a substantially water soluble compound having an active ingredient may be attached to the flow regulator so that as water travels through the flow regulator into the mixing chamber the compound is dissolved to form a liquid solution.

7. Now the assembled brush is ready to use. It delivers fluid and/or the liquid solution with active ingredients, such as perfume, fragrance and/or other active compositions, when the brush is used to sponge or wash human or pet hair or livestock. Once the liquid solution perfume, fragrance and/or active composition is exhausted, water may continue to run through the flow regulator and hose into the brush base, sponge element and onto the animal's fur or hair to rinse any solution off of the animal's coat. Upon exhaustion of the compound in the mixing chamber, the mixing chamber is removed and re-filled or replaced with a new mixing chamber.

Plastic materials have particular application in manufacturing the subject brush assembly, specifically including polyvinyl chloride (PVC) and acrylonitrile butadiene styrene (ABS). The size of the openings in the flexible deformable membrane and sponge element could vary depending upon the viscosity of the liquid composition appointed for delivery. A vast array of animal health care products, soaps, shampoos, compounds and solutions can be applied through use of the subject brush, such as those set forth in Table I hereinbelow.

TABLE I

| | |
|---|---|
| ULTRASHIELD ™ | Insecticide & Repellent |
| SUPERSHIELD RED ™ | Water-Resistant Fly Repellent |
| SUPERSHIELD GREEN ™ | Horse Spray, Herbal Gel & Super Concentrate |
| SHOWSHEEN ™ | Hair Polish & Detangler |
| ULTRASCREEN ™ | Maximum Sun Protection Lotion & Fade Protection |
| SUPERPOO & SHOWCLEAN ™ | Mane & Tail Whitener & Stain Remover |
| ABSORBINE ® | Varying Application; muscle, joint and arthritis pain reliever; |

Figure 1:
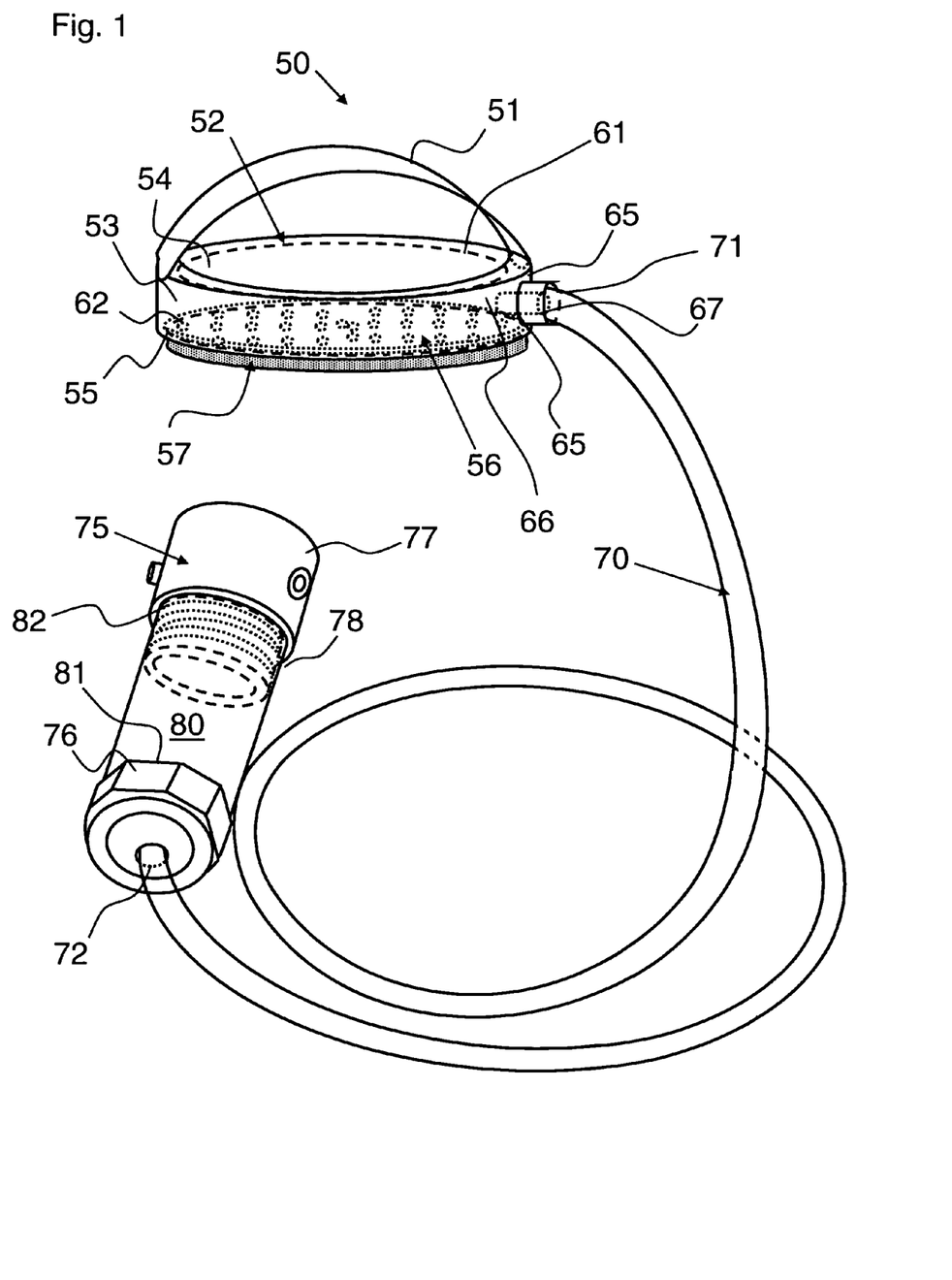
FIG. 1 is a schematic view of an embodiment of the brush assembly of this invention, showing the brush base with the internal cavity therein, the flexible deformable membrane having apertures therein, the sponge element and the orifice attached to the hose, which in turn is attached to the flow regulator herein appointed with the optional mixing chamber.

FIG. 1 illustrates a schematic view of an embodiment of the brush assembly of this invention, shown generally at 50. In the embodiment shown, the optional mixing chamber is attached to the flow regulator. Brush assembly 50 includes a handle 51 and brush base 52 having an internal cavity 53. The internal cavity 53 has a first opening 55 and a second opening 54. A flexible deformable membrane 56 having apertures 62 (at least one aperture, but preferably a plurality of apertures as shown) is inserted within the first elliptical opening 55. A sponge element 57 is inserted within the first opening 55 under flexible deformable membrane 56 for sponging and washing hairs or fur of the coat of an animal.

Flexible deformable membrane 56 includes holes/apertures 62 interstitially therein which are in substantial proximity and alignment with sponge element 57. The second opening 54 receives a back cover 61 with handle 51 attached thereto. Brush base 52 further includes an orifice 65 herein located on side wall 66. Orifice 65 extends into internal cavity 53 and is adapted with a fitting 67 for connection to a second end 71 of a hose 70.

Hose 70 supplies fluid to the brush base 52 and is lightweight, and has a relatively small diameter with varying length and thickness. Hose 70 includes a first end 72 attached to a flow regulator 75 preferably by way of regulator screw top 76. Flow regulator 75 further comprises a body portion 77 appointed to be attached to a fluid or water supply and includes a threaded portion 78 therein for mating with threads or grooves of the regulator screw top 76 or an optional mixing chamber 80, as herein shown. As fluid is delivered from flow regulator 75 it passes into hose 70 and traverses orifice 65 into internal cavity 53 for delivery through apertures 62 of flexible deformable membrane 56 and sponge element 57. This fluid may be water or another fluid source. Flow regulator 75 controls delivery of fluid into hose 70 and visa vie internal cavity 53 of brush base 52 when sponging and or washing fur or hair, releasing fluid through apertures 62 in flexible deformable membrane 56 into sponge element 57 and onto the animal's fur or hair for foaming action and thorough saturation of the hair follicles/fur follicles and shafts penetrating into the coat. With this arrangement, the brush assembly is easy to maneuver and fluid supply can be continuous or intermittent.

In the embodiment shown in FIG. 1 the optional mixing chamber 80 is incorporated into the brush assembly 50. The optional mixing chamber 80 houses a compound appointed to be mixed with water delivered from flow regulator 75 to form a liquid solution that is appointed to be fed through hose 70 into interior cavity 53 of brush base 52 for dissemination of the liquid solution onto the fur or hair. The liquid solution preferably includes active ingredients comprising grooming and cleaning products for a coat of the horse and livestock, and may include shampoos, soaps, perfumes, botanicals, fragrances and/or other active composition comprising insect repellant, flea repellants and treatments, tic repellant, mane and tail hair conditioning compositions, dye compositions, moisturizing ingredients, or antibacterial compounds.

Preferably the compound housed in the mixing chamber 80 is a semi-solid compound soluble in an aqueous environment to form the liquid solution appointed for delivery through hose 70 into interior cavity 53 of brush base 52 for delivery through apertures 62 of flexible deformable membrane 56 and into sponge element 57. Most preferably, this semi-solid compound is a shampoo or soap subject to foaming action. In application, the soap or shampoo in semi-solid form in the cylindrical mixing chamber 80 dissolves slowly as water is forced into mixing chamber 80 by way of flow regulator 75. As the semi-solid soap compound dissolves it suds or soaps-up to provide a soapy liquid solution that is delivered through hose 70. After approximately three to five minutes, the semi-solid becomes used-up and the soapy liquid solution begins to become diluted and consist substantially as water.

Water continues to flow through flow regulator 75, (emptied) mixing chamber 80 and hose 70 to clean and rinse sponge element 57 and the animal. Mixing chamber 80 is preferably constructed as a cylinder having a chamber top 81 that mates with regulator screw top 76, and a chamber bottom 82 that screws onto or otherwise attaches to threaded portion 78 of flow regulator 75. At this point, if sponge element 57 is removable, it may be removed so that water ejecting from apertures 62 in flexible deformable membrane 56 directly rinses the coat of the animal; otherwise sponge element 57 may remain on and become rinsed while rinsing the animal. Mixing chamber 80 is preferably a secondary "sale" item or after market replacement item, with replacement mixing chambers available. Moreover, replacement sponge elements 57 are preferably a secondary "sale" item or after market replacement item. Washing horses and livestock can be an untidy situation with buckets, soap, sponges, and rinse water being necessary. Use of the brush assembly along with the optional mixing chamber provides the ability to deliver the soap and water in a highly efficient, tidy manner. While at the same time, the ability to get the soap deep within the fur follicles yields optimal cleaning of the animal's coat and/mane.

Figure 2A:
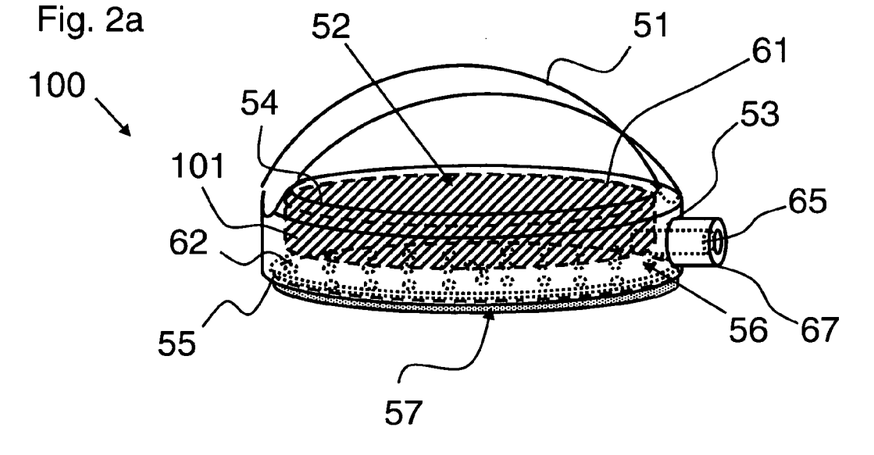
FIG. 2a is a side view depicting the brush base of this invention, showing the internal cavity, the flexible deformable membrane having apertures therein, the sponge element, the back cover, the handle, and the side wall having the orifice for attachment to the hose and flow regulator, and wherein the optional internal porous sponge or soluble disk is inserted into the internal cavity.

FIG. 2*a* illustrates a side view of the brush base for horses and livestock of the present invention, shown generally at 100 wherein the hose and flow regulator are not yet attached to the brush base and wherein the optional internal porous sponge or soluble disk is inserted into the internal cavity. Brush base 100 includes handle 51, first opening 55, second opening 54, internal cavity 53, and orifice 65 appointed with fitting 67 for connection to the second end of the hose and visa vie the flow regulator. Flexible deformable membrane 56 having apertures 62 is housed within first elliptical opening 55. Flexible deformable membrane 56 is aligned with sponge element 57. Second opening 54 receives a back cover 61 with handle 51 attached thereto.

Optionally, an internal porous sponge or soluble disk 101 may be inserted within internal cavity 53. This optional internal porous sponge or soluble disk 101 may be a gel, liquid, solid, or semi-solid formulation that is water soluble and contains fragrance, perfume and/or other active composition. Water delivered by way of the flow regulator and hose enters internal cavity 53 and mixes with the water soluble formulation within the internal porous sponge or soluble disk 101 dissolving the formulation to form a liquid solution within internal cavity 53 which is then delivered through apertures 62 to sponge element 57 and onto the animal's coat. Upon exhaustion of the formulation within the internal sponge 101 (or dissolving of the soluble disk), water may continue to flow through, rinsing sponge element 57 and the formulation off of the animal's coat, such as when the formulation is a soap or shampoo. In this optional arrangement, the flow regulator would preferably not be attached to the optional mixing chamber.

Figure 2B:
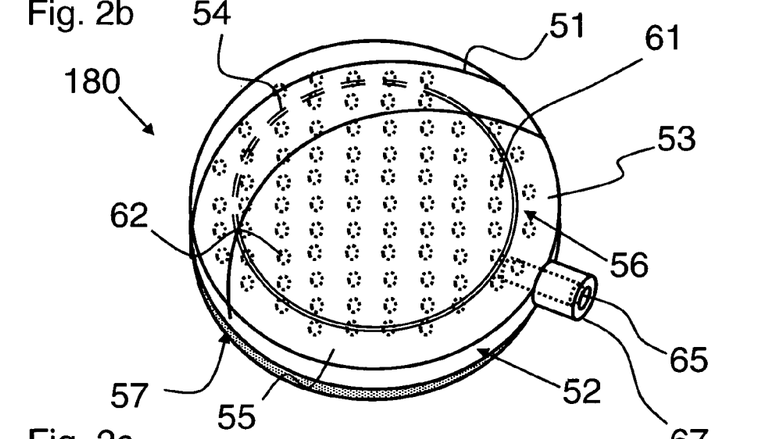
Figure 2C:
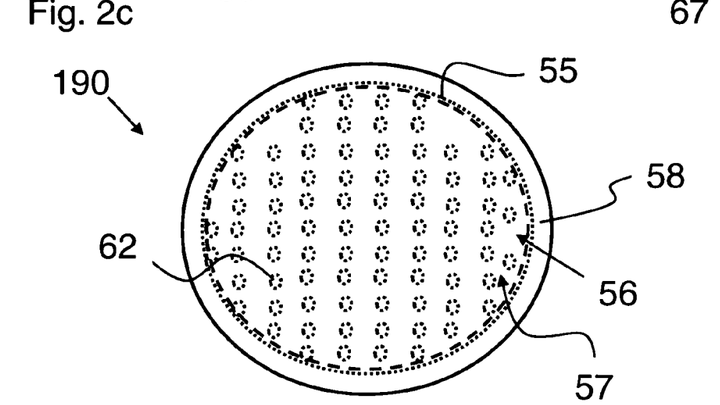

FIGS. 2*b* and 2*c* illustrate views of the brush for horses and livestock depicted in FIG. 2*a*: FIG. 2*b* illustrates a top plane view, shown generally at 180; and FIG. 2*c* illustrates a bottom plane view, shown generally at 190. Handle 51 extends over the brush base 52 of the brush. In operation, a user places their hand with the palm thereof facing downward toward brush base 52, while the top of the hand is in contact with handles 51. Brush base 52 is constructed with internal cavity 53 with first opening 55 and second opening 54. Second opening 55 accommodates flexible deformable membrane 56 having apertures 62 to form a substantially air tight seal. Flexible deformable membrane 56 is in substantial proximity and alignment with sponge element 57. Alternatively, holes 62 of membrane 56 may include a plurality of holes, so that more than one hole 62 is in association with sponge element 57 and the plurality of small holes 62 feed into sponge element 57. Wherein sponge element 57 is removable, it preferably includes a flexible rim 58 bonded thereto that is received within the periphery of first opening 55.

Figure 3:
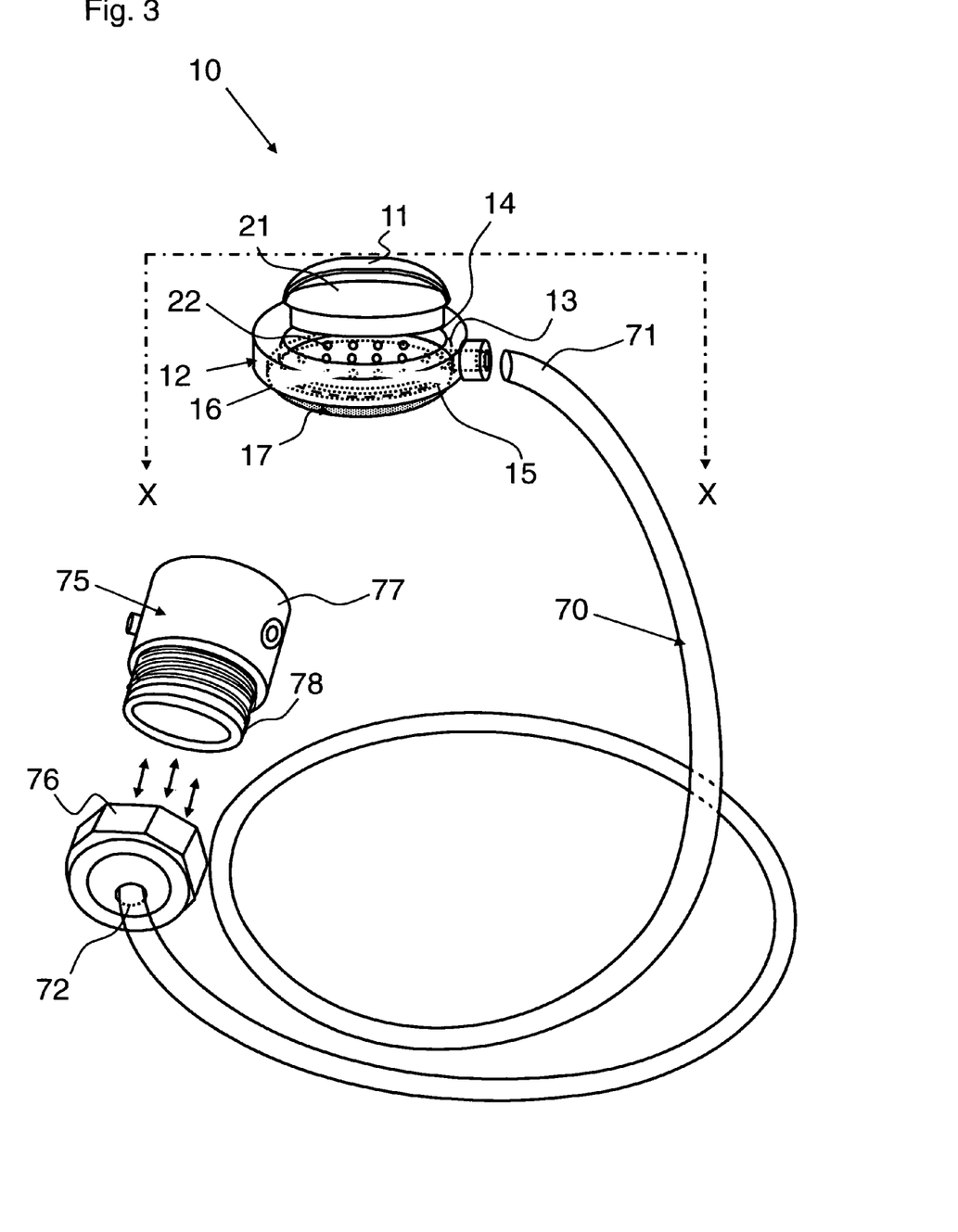
FIG. 3 is an illustration depicting the brush base of this invention, showing the internal cavity, the flexible deformable membrane having apertures, the sponge element, the back cover and the side wall having the orifice for attachment to the hose and flow regulator.

FIG. 3 illustrates at 10 the brush base for horses and livestock of the subject invention with a handle 11 and brush base 12 having an internal cavity 13 and wherein the hose and flow regulator are not yet connected but are also shown in the figure, shown generally at 10. Brush base 12 is constructed with an internal cavity 13 having a first opening generally marked 15 and a second opening generally marked 14. A flexible deformable membrane 16 having apertures is inserted within the first elliptical opening 15. A sponge element 17 is inserted within first elliptical opening 15 under flexible deformable membrane 16. The apertures in the flexible deformable membrane 16 are shown at 22. The second opening 14 receives a back cover 21 with handle 11 attached thereto. Back cover 21 is preferably attached to opening 14 via screw attachment means. Brush base 12 further includes orifice 65 which extends into internal cavity 13 and is adapted with fitting 67 for connection to second end 71 of hose 70 for delivery of the fluid from flow regulator 75 into brush base 12. Hose 70 includes first end 72 attached to flow regulator 75 preferably by way of regulator screw top 76. Flow regulator 75 further comprises a body portion 77 appointed to be attached to a fluid or water supply and includes threaded portion 78 therein for mating with threads or grooves of regulator screw top 76 (as indicated herein) or the optional mixing chamber (as shown in FIG. 1). As water is delivered from flow regulator 75 it passes into hose 70 and traverses orifice 65 into internal cavity 12 for delivery through apertures 22 into sponge element 17.

Figure 4:
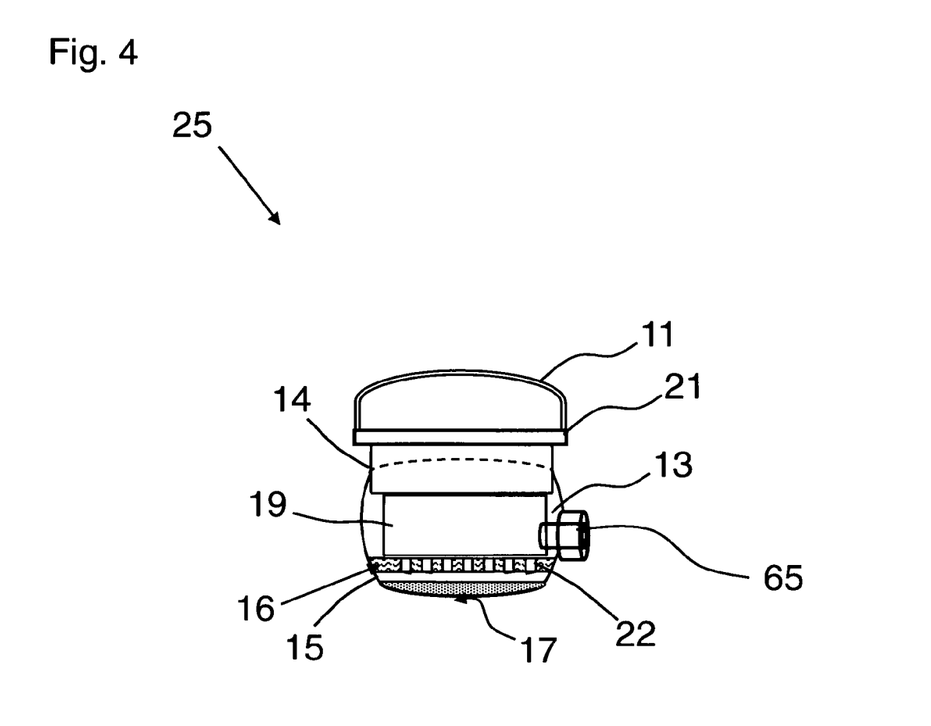
FIG. 4 is a cross section of the assembled brush of the subject invention taken along cross section XX of FIG. 3, showing the relative locations of the flexible deformable membrane having apertures, the sponge element, the back cover, and the side wall having the orifice for attachment to the hose and flow regulator.

FIG. 4 illustrates a cross section of the brush base of the subject invention along cross section XX of FIG. 3, shown generally at 25. In its assembled configuration, the flexible deformable membrane 16 is entirely contained within the first opening 15. The flexible deformable membrane 16 is located against the inner wall defined by the internal cavity 13 so as to form a leak-tight seal or preferably bonded to the inner wall 13. Due to the larger dimension of the flexible deformable membrane 16, it preferably protrudes from the first opening 15 with a convex bulge. Sponge element 17 is aligned with flexible deformable membrane 16 which has apertures 22. When this brush is used, the sponge element 17 attached (fixedly or removably) to flexible deformable membrane 16 contacts the hair, fur, or coat of the horse, pet or livestock first, thereby deforming the flexible deformable membrane 16 and causing release of the fluid into sponge element 17 to yield foaming delivery of the fluid for ultimate penetration of the full shafts, outer layers, and follicles of the fur or hair of the animal. Fluid is passed into internal cavity 13 through orifice 65 from the hose and flow regulator (and optional mixing chamber if applied.

Figure 5:
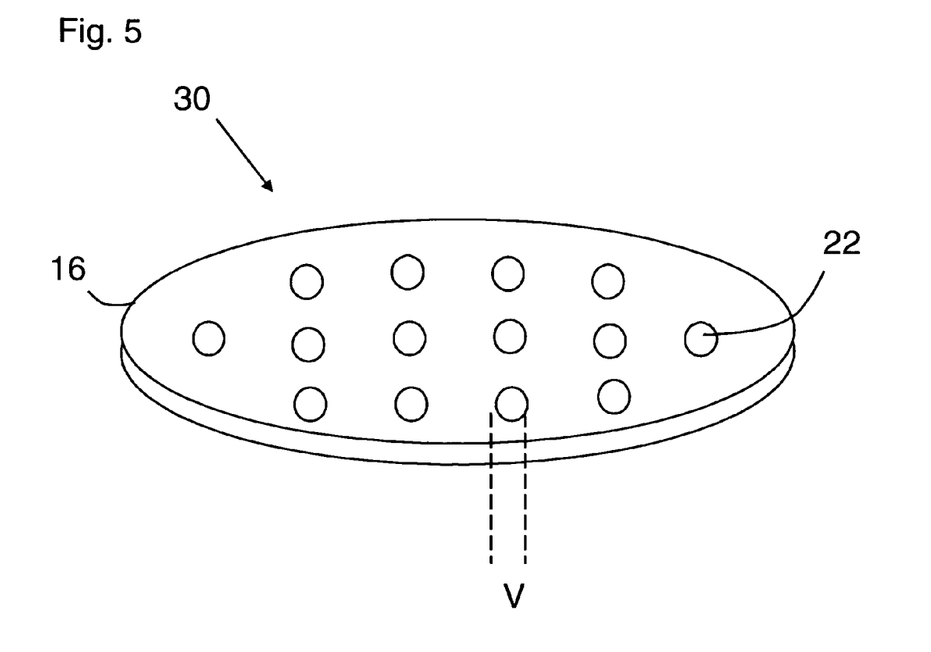
FIG. 5 is an illustration showing the flexible deformable membrane with apertures according to the first embodiment of the invention.

FIG. 5 illustrates the flexible deformable membrane with apertures 22, shown generally at 30. The flexible deformable membrane has apertures 22, which are preferably disposed in a substantially uniform distribution over the surface area thereof. Apertures 22 preferably have a diameter V in the range of 0.010 inch to 0.060 inch wherein there is a plurality of apertures 22. Alternatively, there is at least one aperture 22, and in which case the aperture's size is larger, ranging from 0.06 inch to 1 inch in diameter. The flexible deformable membrane is preferably composed of rubber having a thickness in the range of $\frac{1}{32}$ inch to $\frac{3}{32}$ inch.

Figure 6:
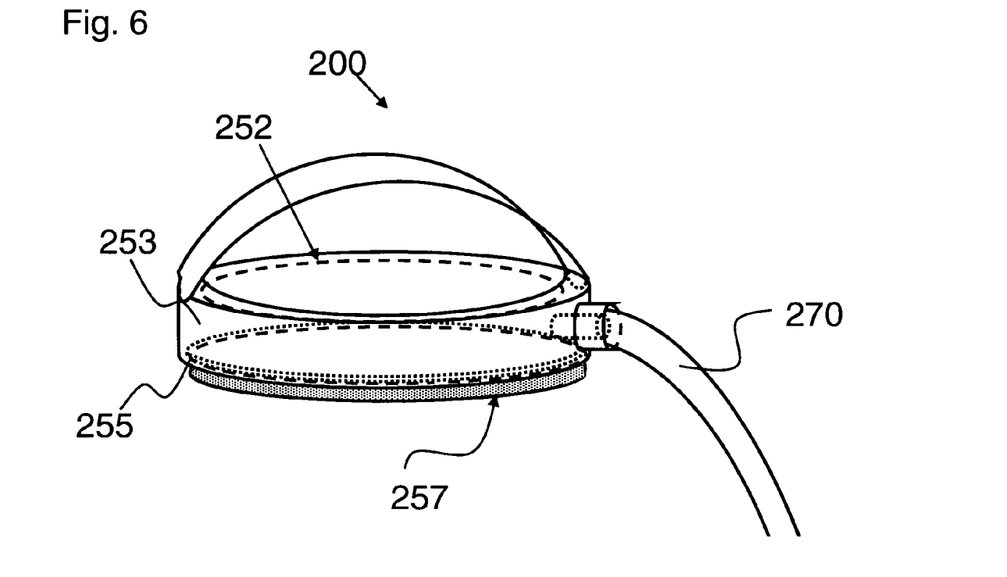
FIG. 6 is a schematic view of an embodiment of the brush assembly of this invention, wherein the brush base with the internal cavity therein, the sponge element and the orifice attached to the hose, which in turn is attached to the flow regulator herein appointed with the optional mixing chamber.

FIG. 6 is a partial schematic view of another embodiment of the brush assembly of this invention, shown generally at 200. Herein, the brush base 252 with the internal cavity 253 therein does not include the flexible deformable membrane, but instead only includes sponge element 257 therein in first opening 255 so fluid flows directly from hose 270 into internal cavity 253 and saturates sponge element 57 for delivery onto the animal's coat.

FIGS. 7a-7c illustrate top views of the sponge element in relation to the flexible deformable membrane. Referring to FIG. 7a, flexible deformable membrane 316 with apertures 322 is bonded/fixedly attached to sponge element 317. Referring to FIG. 7b, flexible deformable membrane 316 with apertures 322 is not attached to sponge element 417, and instead, sponge element 417 includes a flexible rim 418 that is deformed and inserted into the first opening of the brush base for removable insertion and replacement thereof. Referring to FIG. 7c, flexible deformable membrane 416 with includes at least one aperture 422, and is not attached to sponge element 417, and instead, sponge element 417 includes a flexible rim 418 that is deformed and inserted into the first opening of the brush base for removable insertion and replacement thereof.

The brush assembly disclosed herein can be modified in numerous ways without departing from the scope of the invention. Optional internal porous sponge 59 (see FIG. 2a) can be replaced by a plastic silicon shell having an aperture leading to the soluble formulation, which may include perfume, fragrance and/or other active compositions. These ingredients are released from apertures within the flexible deformable membrane to the sponge element upon application of pressure.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A direct application brush assembly for horses and livestock, comprising:
    a. a molded brush base with a handle and an internal cavity with a bottom surface having a first opening, a top surface having a second opening and an orifice;
    b. a flexible deformable membrane having apertures aligned with a sponge element fixedly attached thereto, and appointed for sponging or washing hair or fur;
    c. a cover;
    d. said first opening being adapted to receive said flexible deformable membrane;
    e. said second opening being adapted to receive said cover;
    f. a flow regulator;
    g. a hose having a first end fitted with said flow regulator and a second end fitted to said orifice of said brush base so that said hose delivers a fluid from said flow regulator into said internal cavity of said brush base;
    h. said sponge element being removable from said first opening of said brush base so that said sponge can be replaced with a replacement sponge; and
    i. a soluble disk being provided to be inserted within said internal cavity, said soluble disk being water soluble and containing active ingredients that dissolve as fluid enters said internal cavity by way of said hose and said flow regulator;

whereby said flow regulator controls delivery of said fluid into said hose and vis-à-vis said internal cavity of said brush base when sponging or washing said fur or hair, releasing said fluid through said apertures in said flexible deformable membrane and said sponge element onto said fur or hair.

2. A brush assembly as recited by claim 1, wherein each of said first and second openings is elliptical, said flexible deformable membrane is elliptical, said cover is elliptical, and said sponge element is elliptical.

3. A brush assembly as recited by claim 1, wherein each of said first and second openings is circular, said flexible deformable membrane is circular, said cover is circular, and said sponge element is circular.

4. A brush assembly as recited by claim 1, wherein each of said first and second openings is rectangular, said flexible deformable membrane is rectangular, and said cover is rectangular.

5. A brush assembly as recited by claim 1, wherein each of said first and second openings is square-shaped, said flexible deformable membrane is square-shaped, and said cover is square-shaped.

6. A brush assembly as recited by claim 1, wherein said flexible deformable membrane is composed of rubber having a thickness in the range of $\frac{1}{32}$ inch to $\frac{3}{32}$ inch.

7. A brush assembly as recited by claim 1, wherein said flexible deformable membrane aperture has a diameter in the range of 0.010 inch to 0.060 inch.

8. A brush assembly as recited by claim 1, wherein said sponge element has a thickness ranging from 0.25 inch to 3 inch.

9. A brush assembly as recited by claim 1, wherein said flexible deformable membrane is composed of a flexible polymeric material having a thickness in the range of $\frac{1}{32}$ inch to $\frac{3}{32}$ inch.

10. A brush assembly as recited by claim 1, wherein said fluid is water.

11. A brush assembly as recited by claim 1 comprising a mixing chamber housing a compound appointed to be mixed with water delivered from said flow regulator to form a liquid solution that is appointed to be fed through said hose into said interior cavity of said brush base for foaming dissemination of said liquid solution through said sponge element onto said fur or hair.

12. A brush assembly as recited by claim 11, wherein said liquid solution includes active ingredients comprising grooming and cleaning products for a coat of said horse and livestock.

13. A brush assembly as recited by claim 11, wherein said liquid solution includes active ingredients comprising animal health care products.

14. A brush assembly as recited by claim 11, wherein said liquid solution includes perfume, fragrance and/or other active composition comprising insect repellant, flea repellants and treatments, tic repellant, mane and tail hair conditioning compositions, dye compositions, moisturizing ingredients, or antibacterial compounds.

15. A brush assembly as recited by claim 11, wherein said liquid solution consists of active ingredients selected from a group consisting of insect repellants, flea and/or tic compounds, muscle treatments, therapeutic or moisturizing compounds, or antibacterial compounds.

16. A brush assembly as recited by claim 11, wherein said liquid solution consists of active ingredients selected from a group consisting of perfumes, fragrance, hair-conditioning and detangle products, sun protection lotions, mane and tail whiteners and stain removers, dye compositions, fragrances or other hair/fur/coat-care related products.

17. A brush assembly as recited by claim 11, wherein said compound housed in said mixing chamber is a semi-solid compound soluble in an aqueous environment to form said liquid solution appointed for delivery through said hose and into said interior cavity of said brush base and into said sponge element for delivery to said fur or hair.

18. A brush assembly as recited by claim 17, wherein said semi-solid compound is a shampoo.

19. A brush assembly as recited by claim 11, wherein said mixing chamber is disposable and replacement mixing chambers are available.

20. A direct application brush assembly for horses and livestock, comprising:
   a. a molded brush base with a handle and an internal cavity with a bottom surface having a first opening, a top surface having a second opening and an orifice;
   b. a sponge element having a flexible deformable rim, said sponge element being appointed for sponging or washing hair or fur;
   c. said first opening being adapted to receive said sponge element;
   d. said second opening being adapted to receive a cover that fits onto said second opening;
   e. a flow regulator;
   f. a hose having a first end fitted with said flow regulator and a second end fitted to said orifice of said brush base so that said hose delivers a fluid from said flow regulator into said internal cavity of said brush base;
   g. said sponge element being removable from said first opening of said brush base so that said sponge can be replaced with a replacement sponge; and
   h. a soluble disk being provided to be inserted within said internal cavity, said soluble disk being water soluble and containing active ingredients that dissolve as fluid enters said internal cavity by way of said hose and said flow regulator;

whereby said flow regulator controls delivery of said fluid into said hose and vis-à-vis said internal cavity of said brush base when sponging or washing said fur or hair, releasing said fluid through said sponge element onto said fur or hair.

21. A method for making a direct delivery brush assembly for horses and livestock coats that releases a fluid, comprising the steps of:
   a. forming a brush base having an internal cavity with a bottom surface having a first opening, a top surface having a second opening and an orifice;
   b. producing a flexible deformable membrane having apertures arranged in substantially uniform distribution over the surface area of the membrane;
   c. inserting said flexible deformable membrane into said first opening in said internal cavity;
   d. producing a sponge element appointed to be aligned with said flexible deformable membrane;
   e. aligning and inserting said sponge element with said flexible deformable membrane into said first opening for sponging or washing hair or fur;
   f. inserting a cover on said second opening of said brush base;
   g. connecting a second end of a hose to said orifice of said brush base and connecting a first end of said hose to a flow regulator for delivery of said fluid into said internal cavity of said brush base;

whereby said flow regulator controls delivery of said fluid into said hose and vis-à-vis said internal cavity of said brush base when sponging or washing said fur or hair, releasing said fluid through said apertures in said flexible deformable membrane and said sponge element onto said fur or hair of said horse and livestock.

22. A method for making a direct delivery brush assembly as recited by claim 21 comprising a mixing chamber housing a compound appointed to be mixed with water delivered from said flow regulator to form a liquid solution that is appointed to be fed through said hose into said interior cavity of said brush base for dissemination of said liquid solution into said sponge element and onto said fur or hair.

23. A method for making a direct delivery brush assembly as recited by claim 22, wherein said liquid solution comprises fragrance and/or other active composition comprising shampoo, conditioner, botanicals, insect repellant, flea repellants and treatments, tic repellant, mane and tail hair conditioning compositions, dye compositions, moisturizing ingredients, or antibacterial compounds.

* * * * *